United States Patent
Alderliesten et al.

(10) Patent No.: US 6,322,844 B1
(45) Date of Patent: *Nov. 27, 2001

(54) LOW FAT SPREAD

(75) Inventors: Leendert Alderliesten, Zwijndrecht; Wilhelmus Adrianus Castenmiller; Ronald Albert Schotel, both of Vlaardingen; Jozephus Johannes Verschuren, Poortugaal, all of (NL)

(73) Assignee: Van den Bergh Foods Company, division of Conopco, Inc., Lisle, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/799,924

(22) Filed: Feb. 13, 1997

Related U.S. Application Data

(63) Continuation of application No. 08/442,082, filed on May 16, 1995, now abandoned, which is a continuation of application No. 08/079,664, filed on Jun. 18, 1993, now abandoned.

(30) Foreign Application Priority Data

Nov. 2, 1992 (EP) .................................................. 92203355
Mar. 25, 1993 (EP) .................................................. 93200867

(51) Int. Cl.$^7$ .................................................. A23D 7/015
(52) U.S. Cl. ......................... 426/603; 426/658; 426/804
(58) Field of Search .................................. 426/602, 603, 426/658, 804

(56) References Cited

U.S. PATENT DOCUMENTS

| | | | |
|---|---|---|---|
| 4,978,751 | * 12/1990 | Biton .................................... | 426/658 |
| 5,169,671 | * 12/1992 | Harada ................................ | 426/658 |
| 5,258,195 | * 11/1993 | Lohan .................................. | 426/622 |
| 5,527,556 | * 6/1996 | Frippiat et al. ..................... | 426/573 |
| 5,624,702 | * 4/1997 | Schotel .............................. | 426/804 |
| 5,660,872 | 8/1997 | Van Loo . | |
| 6,010,735 | 1/2000 | Frippiat et al. . | |

FOREIGN PATENT DOCUMENTS

| | | |
|---|---|---|
| 4316425 | 11/1994 | (DE) . |
| 0 237 120 | 9/1987 | (EP) . |
| 0 298 561 | 1/1989 | (EP) . |
| 0 337 889 | 10/1989 | (EP) . |
| 0 355 908 | 2/1990 | (EP) . |
| 0 432 835 | 6/1991 | (EP) . |
| 0509707 | 8/1992 | (EP) . |
| 0 509 707 | 10/1992 | (EP) . |
| 0 532 775 | 3/1993 | (EP) . |
| 605 217 | 12/1993 | (EP) . |
| 3280857 | 12/1991 | (JP) . |
| 3280856 | 3/1992 | (JP) . |
| 90/267450 | 7/1992 | (JP) . |
| 94/12541 | 6/1994 | (WO) . |

OTHER PUBLICATIONS

"Facts and Arguments in Support of the Opposition Against EP–B–0596546".
Facts and Arguments Presented in Support of the Opposition Against EP 0 596 546.
"Annex I".
"Evidence Present A. Publications".
"Rafticreming: The New Process Allowing to Turn Fat into Dietary Fiber", Dr. A. Franck–Frippiat, pp. 193–197, Food Ingedients Europe Conference Proceedings 1992, held on Nov. 25–27, 1992.
*Technical File Raftiline* (RTM) LS, Raffinerie Tirlemontoise S.A., Apr. 1993.
"Raftiline (RTM): Properties and Applications as a Fat Replacer", Dr. A Franck–Frippiat, 6 pages, IBC Conference on *"Fat and Cholesterol Reduced Foods"*, Apr. 1–3, 1992.
"Raftilose and Raftiline (RTM): Ideal Ingredients for Low Calorie Food Products", Dr. A. Franck–Frippiat, 4 pgs., *"Development of Low Fat/Low Calorie Food Products"* conference, Mar. 23–25, 1992.
English translation of "Development De Produits Nouveaux au Depart De La Chicoree", 4 pages, Le Sillon Beige, April 1989.
"Sucrerie Warcoing Haalt Nieuwe Zoetstof Uit Cichorei", Piet Casneuf, 2 pages, Maardblad Industrie Magasine, September 1989.
"On The Nature of the Relationship Between the Structure and Rheology of Food Gels", J.R. Mitchell and J.M.V. Blanshard, pp. 425–235, Food Texture and Rheology, Academic Press, (1979).
"Sweeteners and Function Food Ingredients from Chicory", J. Fockedey, pp. 288–289, Food Ingredients Europe Conference Proceedings, 1989.
English translation of Japanese Patent Publication No. 4–210578 to Ajinomoto Co., Ltd., published Jul. 31, 1992.
English translation of Japanese Patent Publication No. 3–281601 to Ajinomoto Co., Ltd., published Dec. 12, 1991.
"Pfizer opts for Opta Foods", p. 20, Food Manufactue, November 1994.
"Raftiline (RTM) –mehr als nur Fett–ersatz", Dr. A. Franck-Frippiat, pp. 1038–1042, Lebensmittelzutaten, DMZ Lebensmittelindustrie und Milchwirtschaft, 1995.
Letter from Raffinerie Tirlemontoise S.A. to St. Ivel Limited dated Oct. 22, 1992 with enclosed documents: "Technical File Raftiline (RTM) LS", "Raftiline Application" and "Raftiline (RTM) Creme Preparation".

(List continued on next page.)

*Primary Examiner*—Carolyn Paden
(74) *Attorney, Agent, or Firm*—Gerard J. McGowan, Jr.

(57) ABSTRACT

A water-continuous spread comprising: 10 to 50 wt % of an oligofructose and 0.05 to 30 wt % of a biopolymer other than oligofructose and less than 20 wt % of an oil phase.

14 Claims, No Drawings

OTHER PUBLICATIONS

"Texture Profile Analysis" (TPA), pp. 114–117, Food Texture and Viscosity:: Concept and Measurement, Academic Press, 1982.

Instron Universal Testing Machine Chapter 2.1.4, pp. 57–58, Journal of Texture Studies, vol. 6, 1975.

"A Comparison of Three Instrumental Techniques to Evaluate Butter Spreadability"; Anna Fearon and Donald Johnston, pp. 23–37, Journal of Food Quality, vol. 12, 1989.

"Reviewing the Technology of Low–Fat Spreads", G.R. Krawczyk, G.S. Buliga, D.T. Bertrand and W.M. Humphreys, pp. 635–639, Inform, vol. 7, No. 6, June 1996.

"Inulin–Pfanzlcher Ballaststoff", Dr. E. Gruhn, pp. 48–51, Die Ernahrungsindustrie, vol. 6, 1994.

"Substituts De La Matiere Grasse: les forts en texture", Christophe Reibel, pp. 36–38, Revue Laitiere Francaise, No. 525, 1993.

"L'explosion des Fats Substitutes", Pernette Langley-Danysz, Ingredients et Nutrition, RIA, No. 485 pp. 44, 47, 48 and 50, Sep. 14–27th 1992.

"Desserts Laitiers: de substituts naturels"; pp. 44, 48 and 50, Ingredients Revue Laitiere Francaise, No. 512, November 1991.

"Raftilose and Raftiline (RTM) as Sugar and Fat Replacers", Test of Oral Presentation by Dr. A. Franck–Frippiat, New Product Seminar, Oct. 8–10, 1991.

Conference Programme, Food Ingredients Europe, Nov. 25–27, 1992 and Test of Oral Presentation entitled Rafticreming: The new process allowing to turn fat into dietry fibre given by Dr. A. Franck–Frippiat at the conference.

Raftiline (RTM), Dr. A. Franck–Frippiat, "Themadag NLRO: Vetreduktie in levensmiddelen""Themadag NLRO: Vetreduktie in levensmiddelen", Apr. 22, 1993.

Raftiline (RTM): "A new fat replacer for purified inulin"; Dr. A. Franck–Frippiat, "Course low–calorie food product development", Jun. 15–17, 1993.

"Texture of semi–solid foods: sensory and physical correlates", W. Henry, M. Cats, F. Pilgrim and A. May, pp. 155–157, Journal of Food Science, vol. 36, 1971.

Clarke, M.A. et al., *Polyfructose Functions and Properties*; sugar processing Research, Inc.

*Inulin*; Siege Social: rue de la sucrerie 1—B–7740 Pecq–Warcoing.

Product Book—Raftilose® & Raftiline®.

European Search Report EP 93 20 1727.

PCT Appln. WO 93/06744 (With Derwent Abstract).

* cited by examiner

LOW FAT SPREAD

This is a continuation application of Ser. No. 08/442,082, filed May 16, 1995, now abandoned, which is a continuation application of Ser. No. 08/079,664, filed Jun. 18, 1993, now abandoned.

BACKGROUND OF THE INVENTION

The present invention relates to low or no-fat spread products, in particular to water-continuous spreads comprising 10 to 50 wt %, calculated on the total composition, of an oligofructose. Such spreads are useful because it is a low-calorie foodstuff rich in fibre material which has an excellent feeling in the mouth etc.

Many attempts have been made to formulate low fat spread products. Amongst the various reasons why such products are desired is the wish to reduce the caloric content of the spread and other dietetic considerations.

Over the last decade many non-triglyceride substances have been described as potential fat-replacers in food products. Examples thereof are waxes, e.g. jojoba oil and hydrogenated jojoba oil, polysiloxanes, acylated glycerides, polyalkoxyglycerolethers, dicarboxylic acid esters, polyol fatty acid polyesters and the epoxy extended derivatives thereof. Examples of disclosures of fat-replacers are e.g. U.S. Pat. Nos. 3,600,186, 4,005,195 and 4,005,196.

A substance that has widely been applied as a fat extender is water. This use of water has, for example, led to the introduction of so-called halvarines. If relatively high levels of water are used, often thickening agents and/or gelling agents are used for avoiding adverse effects of the high water level.

In particular effort has been directed towards the development of fat-replacement compositions which possess a smooth and oily taste, texture, mouthfeel and lubricity without resulting in an off-taste or malodour.

For example EP 298 561 (Unilever N.V.) describes the preparation of edible plastic dispersions not having a continuous fat phase, said composition including at least two gelling agents forming two gel-forming % compositions.

EP 509 707 discloses low fat spreads containing a combination of water soluble starch, alginate and an ion source. Spreads according to this document may optionally contain 1 to 15% of a soluble vegetable fibre. An example of a suitable fibre for this purpose is INULIN which is for example marketed under the trade name FIBRULINE.

JP 267450/90 (Ajinimoto Co. Ltd.) discloses the use of polyfructan as a fat or oil substitute in food products. Preferred polyfructans are low caloric polysaccharides of the inulin type, which are mainly composed of beta-2,1-bonds). Japanese patent applications 03/280856 and 03/280857 to Ajinomoto Co disclose spreads prepared by solubilizing certain fructan types in hot water or an aqueous solution of food ingredients, followed by cooling under stirring and allowing to stand as to yield a pasty, sometimes butterlike composition.

SUMMARY OF THE INVENTION

A problem with water-continuous spreads containing low fat levels and high fibre levels is that they often do not possess the desired plasticity and/or they are too hard and/or they are too thixotropic. Also they sometimes have a tendency to loose water, sometimes the structure is not quite smooth and may show some graininess and also they may have a tendency to loose structure upon shear.

Polysaccharides of the Inulin type are for example marketed under the trade name Raftiline™ and Fibruline™. Raftiline has been recommended for use in table spreads, for example in fat-continuous spreads containing 20–25 wt % of fat and wt % of Raftiline.

Surprisingly it has been found that water-continuous spreads of low fat content, high fibre content and good rheological properties can be obtained if the aqueous phase of the composition contains relatively high levels of oligofructoses in combination with specific levels of other ingredients.

Accordingly the present invention provides a water-continuous spread comprising: 10 to 50 wt % of an oligofructose and 0.05 to 30 wt % of a biopolymer other than oligofructose (with an average chain length of 10 to 200 units) and less than 20 wt % of an oil phase.

DESCRIPTION OF THE PREFERRED EMBODIMENTS

The Oligofructose Material

For the purpose of the invention, 10 to 50 wt % of oligofructoses are used. The oligofructose employed may not only contain fructose units, but also minor amounts of other monosaccharide units, such as those derived from glucose. Most preferred are materials containing one (terminal) sucrose unit, the remaining groups mainly being fructose units. Also the oligofructose is preferably of the beta-2,1 type, more specifically it is inulin which may be obtained from plants such as e.g. Compositae species and fructans obtained from various micro-organism as e.g. *Aspergillus sydowii*. Especially preferably inulin materials derived from Jerusalem artichoke of chicory are used. Preferably commercially available inulin materials like Raftiline or Fibruline are used. Other suitable oligofructoses are e.g. irisin and lycorisin.

The (weight) average degree of polymerisation of the oligofructose material is preferably from 5 to 200, more preferred 7 to 70, most preferred 10 to 30. Also preferably the oligofructose contains less than 5% w.w. of mono- and disaccharides. Some hydrolysis of the longer chains of the natural oligofructose may therefore be desirable to adjust the number of monosaccharide units in the molecule. Although a minor amount of chain branching in the oligofructose does not seem to affect performance, it is preferred that the oligofructose employed is substantially linear.

Compositions of the invention preferably contain a structuring amount of oligofructoses. For the purpose of the invention, structuring amounts of oligofructoses are levels at which the oligofructose material is no longer soluble in the system, but is present as discrete particles which provide structure to the product. The structuring amount of oligofructoses can suitably be determined by any suitable mathos e.g. by measuring the melting point or by mixing all ingredients other than oligofructoses and then gradually adding oligofructoses while measuring the viscosity. At a certain level of oligofructoses an increase of the viscosity will be observed, indicating that a structure is formed by the oligofructoses. For the purpose of the invention any level of oligofructoses above the level where a structure begins to form are referred to as structuring amounts.

The structuring amount of oligofructoses may depend on the type of oligofructoses used and the remaining ingredients of the product. For inulin type oligofructoses, in particular those derived from Jerusalem artichoke or chicory, the structuring amount is generally more than 15 wt %, for example more than 15 wt % and less than 40 wt %, more preferred 17 to 37 wt %, most preferred 20 to 35 wt %. For other oligofructoses similar structuring amounts apply.

Preferably the particle size of the oligofructose agglomerates in the spread is in the order of magnitude of 0.5–20, preferably 1–5 micrometer which can be effected by suitable processing. The size of the primary oligofructose particles preferably is in the order of magnitude of 50 to 500 nm.

The Biopolymer Materials

Compositions of the invention contain from 0.05 to 30 wt % of biopolymers other than oligofructoses. Preferably the level is from 0.1 to 20 wt %. The biopolymers may be added as such or may for example be included in the form of commercially available fat-replacers.

Suitable biopolymer materials may for example be selected from carbohydrates (especially starches and gums) and proteins. Preferably gelling biopolymers are used.

The preferred levels of biopolymers for obtaining optimum product properties (e.g. plasticity and/or non-thixotropy), generally depend on the type of biopolymer used. Also the preferred amount of biopolymers is dependant on the desired degree of thickenina or gelling and the presence of other ingredients in the composition.

If gums are used, their preferred level is 0.05 to 5 wt %, more preferred 0.1 to 1.5 wt %, most preferred 0.2 to 1 wt %. Suitable gums may for example be selected from the group of agar, algin, arabic, carrageenan, furcelleran, gellan, ghatti, guar, karaya, larch, locust bean, pectin, tragacanth and xanthan gum. Especially preferred is the use of agar, carrageenan, furcelleran, guar, locust bean, pectin and xanthan gum. Most preferred is the use of locust bean, pectin and xanthan gum. Also preferably the biopolymers may be incorporated by including commercially available fat-replacers based on gums, for example Slimgel™. Also preferably sheared thermoreversible polysaccharide gels or sheared chemically set polysaccharide gels may be used such as for example disclosed in EP 355 908 or EP 432 835.

If starches are used as biopolymer material, preferably gelling starches are used. Especially preferred is the use of modified starches, for example hydrolysed starches such as Paselli SA2 (Avebe), N-oil (National starch). Also commercially available fat-replacers which are based on these biopolymer materials may be used, for example Stellar™. The level of (modified) starches is preferably 5 to 20 wt %, more preferred 6 to 17 wt %, most preferred 7 to 15 wt %; if the modified starches are used in combination with other biopolymer materials, their level may be lower for example 0.05 to 10 wt %.

Also preferred is the use of other carbohydrate based biopolymer materials such as microcrystalline cellulose, for example Avicel™. Their preferred level of from 0.1 to 10 wt %.

If proteins are used as biopolymer material, preferably proteins are used as disclosed in EP 237 120 (incorporated by reference). Examples of suitable materials are gelatin, soy protein, milk protein etc. Especially preferred is the use of gelling proteins, most preferred is the use of gelatin. The level of (gelling) proteins is preferably from 0.05 to 10 wt %, more preferred 0.3 to 7 wt %, most preferred 0.7 to 5 wt %. Also commercially available fat replacers based on these materials may be used for example Simplesse™ or Dairylo™.

The Oil Phase

Spreads according to the invention are water-continuous and contain less than 20 wt % of an oil phase. For the purpose of the invention a water-continuous spread is either fat-free or is an oil-in-water emulsion.

Throughout this specification the terms oil and fat are used interchangeably. They are meant to include triglycerides of natural or synthetic origin such as soybean oil, sunflower oil, palm oil, fish oil, rapeseed oil, coconut oil, and hydrogenated, fractionated and/or interesterified triglyceride mixtures as well as edible substances that are physically similar to triglycerides such as waxes, e.g. jojoba oil and poly fatty acid esters of mono- or di-saccharides, and that can be used as replacement for or in admixture with triglycerides.

Preferably the fat is present in the form of small fat globules or crystals, having a volume weighted mean diameter of less than 20 gm, more preferred from 0.1 to 5 gm, most preferred from 0.5 to 2 gm. The presence of these small fat particles in low fat spreads of the invention has the distinct advantage of providing an improved appearance to the product.

In a very preferred embodiment of the invention at least part of the fat is dairy fat. Preferably at least 10 wt % based on the total weight of the fat is dairy fat, more preferred more than 50 wt %, most preferred more than 90 wt % or even 100 wt %. The dairy fat can be derived from any dairy source. Especially preferably the dairy fat is derived from dairy cream or cream cheese.

In another preferred embodiment of the invention the fat is derived from non-dairy creams.

The use of fat sources wherein the ratio of fat to protein is high, for example cream cheese and dairy cream or non-dairy cream, is preferred. These materials provide an excellent flavour to the product. Preferably fat sources are used, wherein the weight ratio of fat to protein is more than 5:1, more preferred more than 10:1, most preferred from 50:1 to 1000:1.

Spreads according to the invention comprise less than 20 wt % of fat, more preferred 0 to 10 wt %, for example 0.1 to 7 wt % or 1 to 3 wt %. Also spreads of the invention may be substantially free from fat or contain very low levels of fat (0.01 to 2 wt %).

Other Ingredients

In addition to the above mentioned ingredients, spreads of the invention may comprise a number of optional ingredients such as flavouring, salt, preservatives, acidifiers, vitamins, colouring materials etc.

Preferably the level of flavouring materials (other than those which are incorporated through the dairy ingredients) is less than 0.5 wt %, for example 0.01 to 2 wt %. Preferably the level of salt (sodium chloride) is from 0–4 wt %, more preferred 0.1 to 3 wt %, most preferred 0.5 to 1.2 wt %. Preservatives are preferably incorporated at a level of 0–4 wt %, more preferred 0.01 to 1 wt %, most preferred 0.05 to 0.3 wt %. Especially preferred is the use of potassium sorbate. A preferred colouring material is carotene; preferred levels of colouring material are from 0–1 wt %, more preferred 0.01 to 0.2 wt %. Acidifiers may be incorporated to bring the pH of the product to the desired level, preferably the pH of the product is from 3 to 10, more preferred 3.5 to 7. A suitable acidifier is for example tactic acid or citric acid.

Another optional ingredient which may be present in compositions of the invention are proteins. Preferably the protein level in spreads of the invention is from 0.5 to 15 wt %, more preferred, 2 to 6 wt %, most preferred 2.5 to 4%. In an especially preferred embodiment of the invention the protein are partially or wholly obtained from dairy sources. In another preferred embodiment of the invention the protein is wholly or partially a vegetable protein, especially soy bean protein. For example if mixtures of these ingredients are used suitable weight ratios of dairy protein to vegetable protein may for example be from 10:1 to 1:10.

The spread may further containing small particles such as herbs and vegetables. The total level thereof will generally be less than 10 wt %.

Spreads of the invention will generally comprise fairly high levels of water, say from 50 to 89.95 wt % of the composition, more preferred 55 to 85 wt %, most preferred 60 to 70 wt %. Water may be incorporated as such, or as part of the other ingredients such as milk etc.

Product Properties

The present invention provides water-continuous spreads being smooth, butter-like and low calorie which can be used with good results on sandwiches, bread etc e.g. to replace halvarines or margarine.

Spreads of the invention have improved properties for example relating to plasticity, hardness, non-thixotropy, gumminess and chewiness.

Preferably spreads of the invention are plastic in that it has a stress strain relation with a maximum stress occuring at a strain max of 0.001 to 0.5, more preferred 0.01 to 0.3 and a stress &max at a strain cmax of 0.01 to 100 kPa more preferred 0.3 to 60 kPa and a ratio of the plastic stress &p to &max (5p/&max) of 0.1 to 1, more preferred 0.2 to 0.95.

A suitable method for determining these parameters is described in EP 298 561. This can be done with a series of measurements using a parallel plate squeezing flow geometry. the measurements are carried out using a parallel plate plastometer (preferably and Instron™), wherein a block of the material to be tested is deformed between two parallel plates that move towards each other. the deformation is inflicted at constant rate preferably at a deformation of $0.0167\ s^{-1}$ (100% compression in 1 minute). The corresponding stress at increasing deformation (strain) is determined by recording the force that is required to keep the rate of deformation constant while the deformation magnitude increases. A series of measurements is carried out on a series of blocks of materials to be tested, having varying thicknesses. From these measurements the stress-strain relation of the material is obtained by extrapolating the results to infinits thickness. The stress is expressed in kPa and recorded as a function of the strain c=ln(HO/H), Ho indicating the thickness of the testblock before the measurement and H indicating the thickness during measurements. Suitably the stress strain relation-ship is determined at 5° C.

Occasionally, the above method does not provide a stress/strain relationship with a clear relative maximum stress 6max at a strain Emax. Under these circumstances the above method for determining the stres/strain relationship should be repeated while decreasing the speed of measurement (e.g. 2–10 times slower). If this still not results in a clear maximum in the curve, then Emax may be determined by determining the strain at the intersection of two tangents of the curve: (1) at E=O and (2) at $E_p$ Preferably spreads according to the invention also have an improved hardness. Preferably the Stevens value of the spreads is more than 50 g at 5° C., more preferably from 65 to 1000 g, inost preferably 120 to 700 g. The Stevens value may be obtained by analyzing samples with a Stevens LFRA Structure Analyser (ex Stevens & Son Weighing machines Ltd, London EC 1V 7 LD, U.K) and using a 4.4 mm probe.

Preferably spreads in accordance to the invention also have a reduced degree of thixotropy. It is believed to be well within the ability of the skilled person to determine whether a spread is non-thixotropic. A suitable test for this pupose is to remove a portion of the spread from the tub with a knife, followed by spreading onto bread. A non-thixotropic spread retains its firmness during removal from the tub and spreading. A thixotropic spread is also relatively firm during removal from the tub, but looses its structure during spreading and regains its firmness after spreading.

Also preferably spread of the invention have a preferred hardness, gumminess and chewiness as measured by TPA (texture profile analysis) or by CUC (Cycle until count). These methods are for example described by William M. Breene in Journal of Texture studies 6 (1975) 53–82. Suitably TPA and CUC measurements are done with a Stable Micro Systems model TA-XT2/25 kg using XT.RA Dimension V3.6 software, following the procedure as outlined in the Guidelines of athe apparatus and software. Preferred settings are outlined in the Example.

Preferably spreads according to the invention satisfy one or more of the following features as measured by TPA (force in compression mode):

(1) a hardness (force value corresponding to the first major TPA peak) of more than 1.2 N, preferably 1.3 to 4.0 N, most preferably 1.4 to 2.5 N;

(2) a gumminess (hardness*cohesiveness) of more than 0.7, more preferred 0.75 to 2.0, most preferred 0.8 to 1.8;

(3) a chewiness (gumminess*springiness) of more than 0.7, more preferred 0.75 to 2.0, most preferred 0.8 to 1.8.

Preferably spreads according to the invention satisfy the following feature as measured by CUC (force in compression test, 40 seconds cycle time) the ratio of initial hardness to hardness at 260 seconds is less than 1.5, more preferred 1.0 to 1.45, most preferred 1.0 to 1.4.

Preparation

Spreads of the invention may be prepared by any suitable method for the preparation of water-continuous spread products. A preferred method however involves the mixing of the ingredients, optionally followed by pasteurisation and homogenisation, followed by cooling in one or more scraped surface heat exchangers (A-units) to a temperature of 0 to 10° C., optionally followed by processing through one or more C-units.

After preparation the spreads are generally packed in wrappers or containers, generally tubs with a content of 2–1000 g will be used, especially 5, 10, 15, 250 or 500 g. Preferably the packed product is stored at refrigerator 1 temperatures.

EXAMPLE 1

TPA measurements were carried out in Stable Micro Systems model TA-XT2/25 kg using XT.RA Dimension V3.6 software. The temperature of measurement was 5° C. A 12.7 mm steel probe was used, the speed was 0.4 mm/s, the penetration depth was 80% of the product, the product height was about 2 cm in a tub. A one second pause was held between the first and second peak.

The CUC measurements were made with the same apparatus, software, temperature and sample height in tub as indicated above. The speed was 0.2 mm/s, the penetration depth 4.0 mm (cycle time about 40 seconds).

Four test samples A-D were evaluated. Product A (comparison) was a spread of 25 wt % Raftiline LS in water. Product B was a spread with 25 wt % Raftiline LS and 35 wt % Stellar in wa-Ler. Product C (comparison) was a spread of 33 wt % Raftiline LS in water; product D was a spread of 33 wt % Raftiline LS and 35 wt % Stellar in water.

The following results were obtained:

| | TPA measurements | | |
|---|---|---|---|
| Sample | hardness | gumminess | chewiness |
| A | 0.64 | 0.27 | 0.24 |
| B | 1.54 | 0.99 | 0.96 |
| C | 1.09 | 0.59 | 0.55 |
| D | 2.45 | 1.23 | 1.20 |

| | CUC measurements | | |
|---|---|---|---|
| (N) t = 0 Sample | hardness (N) t = 260 (peak 1) | gumminess hardness$_{t-0}$/ (peak 7) | hardness$_{t-260}$ |
| A | 0.63 | 0.37 | 1.7 |
| B | 0.55 | 0.46 | 1.2 |

EXAMPLE 2

| 33.0 parts | inulin (Raftiline LS containing mainly 10–60 fructose units) |
| 1.5 parts | NaCl |
| 0.12 parts | potassium sorbate |
| 0.05 parts | B-carotene (1% water soluble solution) |
| 1 part | gelatin, 250 bloom (ex Geltech) |
| up to 100 parts | water |

All the ingredients were mixed together with the exception of inulin and then added to cold water. When the ingredients were completely dissolved the inulin was added slowly to the solution. The suspension was then mixed for 5 minutes with a high energy mixer [Ultra turrax (trade name) type TP 18/10]. During the mixing the pH was adjusted to 4.7 by adding a small amount of tactic acid. The mixture so obtained was filled in tubs, which were immediately stored in a refrigerator at 5° C. After one week storing the product was tested and showed a smooth texture and a very acceptable mouthfeel. The Stevens value of the product was determined and found to be 26. When shear was applied to the product less water was released than from a corresponding product without gelatin.

EXAMPLE 3

| 33.0 parts | inulin (containing mainly 2–60 fructose units) |
| 1.5 part | gelatin |
| 1 part | sunflower oil |
| 1.5 parts | NaCl |
| 0.12 parts | potassium sorbate |
| 0.05 parts | β-carotene (1% water soluble solution) |
| 1 part | Na-caseinate |
| trace | spread flavour |
| up to 100 parts | water |

All the ingredients were mixed together with the exception of inulin and then added to cold water. When the ingredients were completely dissolved the inulin was added slowly to the solution. The suspension was then mixed for 5 minutes with a high energy mixer [Ultra turrax (trade name) type TP 18/10]. During the mixing the pH was adjusted to 4.7 by adding a small amount of tactic acid. The mixture so obtained was filled in tubs, which were immediately stored in a refrigerator at 5° C. After one week storing the product was tested and showed a smooth texture and a very acceptable mouthfeel. The Stevens value of the product was determined and found to be 50. When shear was applied to the product less water was released than from a blank without gelatin. When shear was applied to the product less water was released than from a corresponding product without gelatin.

EXAMPLE 4

The following compositions were made by mixing the inulin into water of 65° C., cooling to 45° C. and mixing the remaining ingredients. All compositions contained 0.12 wt % potassium sorbate, 0.8 wt % NaCl, lactic acid to pH 4.8. the balance of the compostions was water. The NDC (non-dairy cream) had a fat content of 26.9 wt %. The cream had a fat content of 45 wt %.

| | Ingredient (wt %) | | | | |
|---|---|---|---|---|---|
| composition | Onulin | Stellar | gelatin | butter milk powder | ndc |
| A | 33 | 20 | — | — | — |
| B | 33 | — | 1 | 1 | — |
| C | 33 | 20 | 1 | — | — |
| D | 33 | 20 | — | 1 | — |
| E | 33 | 20 | 1 | 1 | — |
| F | 33 | 20 | 1 | — | — |
| G | 33 | 20 | 1 | — | 4 |
| H | 33 | 20 | 1 | — | 12 |
| I | 33 | 35 | — | — | 12 |
| J | 33 | 30 | — | — | 12 |
| K | 33 | 30 | 0.25 | — | 12 |
| L | 33 | 30 | 0.50 | — | 12 |
| M | 33 | 30 | 0.75 | — | 12 |
| N | 33 | 30 | 1 | — | 12 |

EXAMPLE 5

A spread of the following composition was prepared.

| Ingredient | wt % |
|---|---|
| Raftiline LS | 30 |
| gelling starch | 5 |
| cream (40% fat) | 7 |
| gelatin | 0.25 |
| CMC (7 mf ex Hercules) | 0.07 |
| NaCl | 0.8 |
| potassium sorbate | 0.2 |
| TiO$_2$ | 0.2 |
| flavouring | 100 ppm |
| water | balance |
| pH | 5.2 |

The method of preparation was as follows: The starch was solubilized in water at 85° C. and kept at this temperature for 10 minutes. The solution was cooled to 65° C. The CMC and 0.07% of the Raftiline LS were premixed and added. The mixture was further cooled to 60° C. the cream was added. The remaining ingredients except for the flavour were added at 60° C. The pH was set to 5.2 using a 10% tactic acid solution. Finally the flavours were added.

(*) oligofructose ex Tiense Sulker raffinadery.
(**) A modified maltodextrin starch (6110=97-2 ex National Starch). This starch is a blend of modified food starches, having rheological properties as follows:

$G'_{max}$ is 5.0 after complete dispersion in water (17.2%) and a log $G'_{max}$ of 4.7 (log of ½ G') at 6486 seconds after dispersion.

What is claimed is:

1. A water-continuous, butter-like spread comprising:

from 0.01 up to 20 wt. % fat, at least 10 wt. % of the fat based on the total level of fat being dairy fat, 10 to 50 wt % of an oligofructose, and 0.05 to 30 wt % of a biopolymer other than oligofructose said spread having a stress/strain relationship with a maximum stress occurring at a strain $\epsilon$max of 0.001 to 0.5, and a stress $\delta$max at the strain $\epsilon$max of 0.01 to 100 kPa and a ratio of the plastic stress $\delta$p to $\delta$max ($\delta$p/$\delta$max) of 0.1 to 1 at 5° C., said spread having a Stevens hardness of more than 50 g at 50° C. said spread being butter-like.

2. A water-continuous spread according to claim 1, wherein the biopolymer is selected from the group of gums, starches microcrystalline cellulose and proteins or mixtures thereof.

3. A water-continuous spread according to claim 2, wherein the gums are selected from the group of agar, algin, arabic, carrageenan, furcelleran, gellan, ghatti, guar, karaya, larch, locust bean, pectin, tragacanth and xanthan gum and used at a level of 0.05 to 5 wt %.

4. A water continuous spread according to claim 2, wherein the starch is a gelling starch.

5. The water continuous spread according to claim 4 wherein said gelling starch is a hydrolyzed starch used at a level of 5–20 wt. %.

6. A water-continuous spread according to claim 2, wherein the protein is a gelling protein.

7. The water continuous spread according to claim 6 wherein the gelling protein is gelatin used a level of 0.5 to 10 wt. %.

8. A water-continuous spread according to claim 1 satisfying one or more of the following features as measured by texture profile analysis (1) a hardness of more than 1.2 N;

(2) a gumminess of more than 0.7;

(3) a chewiness of more than 0.7.

9. A water-continuous spread according to claim 1, whereby the ratio of the initial hardness to the hardness at 260 seconds as measured by CUC (40 seconds cycle time) is less than 1.5.

10. The water-continuous spread according to claim 1 with a stress/strain relationship with a maximum stress occurring at a strain $\epsilon_{max}$ of 0.01 to 0.3, and a stress $\delta_{max}$ at a strain $\epsilon_{max\ of}$ 0.3 to 60 kPa and a ratio of the plastic stress $\delta$p to $\delta_{max}$ ($\delta$p/$\delta_{max}$) of 0.2 to 0.95 at 5° C.

11. The water-continuous spread according to claim 1 wherein at least 50 wt % of the fat is dairy fat.

12. The water-continuous spread according to claim 1 wherein the fat is derived from the group consisting of dairy cream and cream cheese.

13. The water-continuous spread according to claim 1 wherein at least part of the fat is non-dairy cream.

14. The water-continuous spread according to claim 1 further comprising protein wherein the ratio of fat to protein is more than 5:1.

* * * * *